United States Patent Office 3,328,774
Patented June 27, 1967

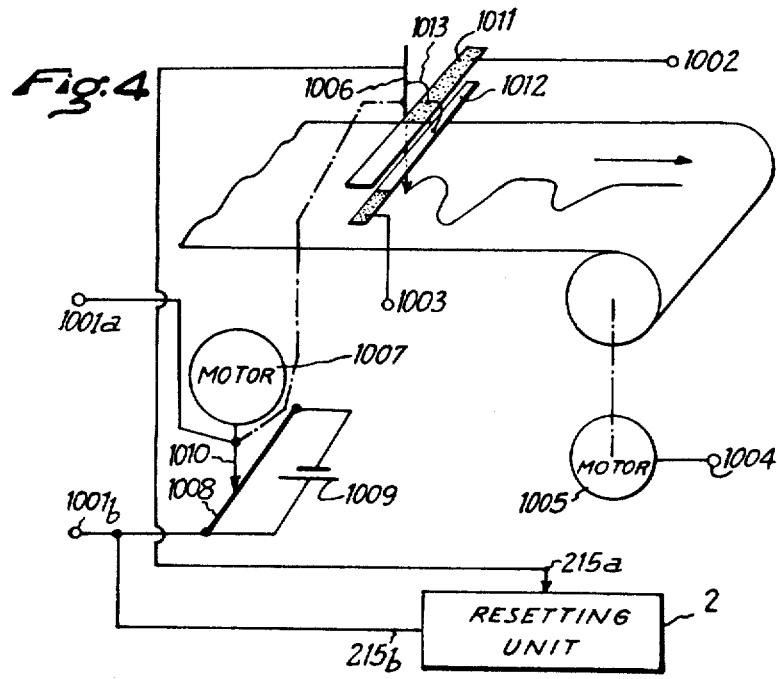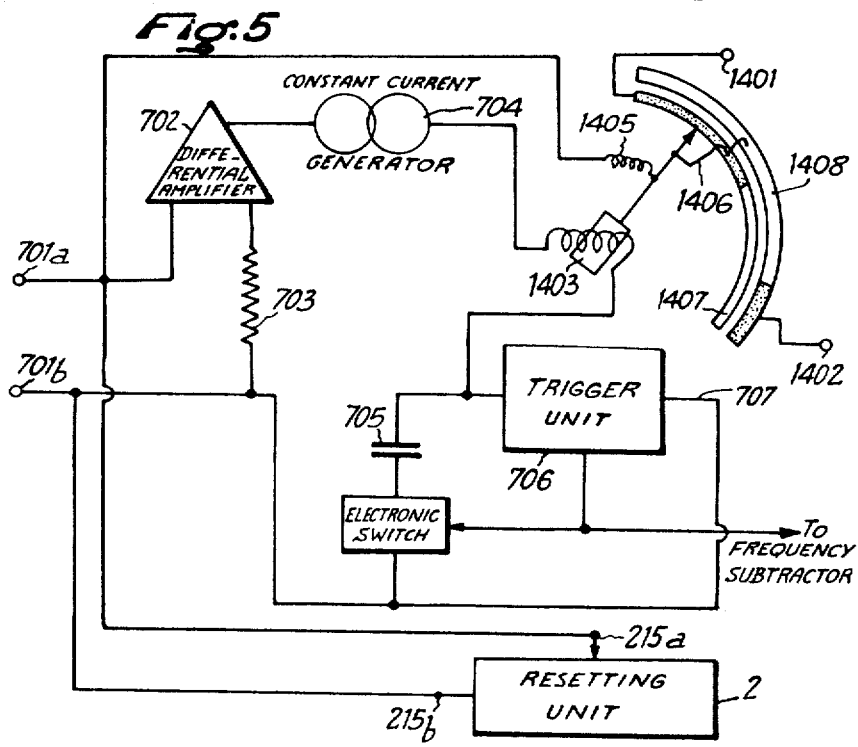

3,328,774
AUTOMATIC PROGRAMMING IN THE UTILIZATION OF A VARIABLE ELECTRICAL RESPONSE
Bernard Louvel, 12 Rue du General Lorencez, Pau, Basses-Pyrenees, France
Filed Nov. 8, 1966, Ser. No. 592,789
3 Claims. (Cl. 340—172.5)

ABSTRACT OF THE DISCLOSURE

The invention is broadly concerned with the automatic control, in conformity with a predetermined programme, of the various processing operations which are to be performed on a variable electrical response, such as for instance the output of a chromatograph, which includes a succession of comparatively steep voltage variations or "peaks." The instant invention provides means whereby the peaks are separately processed after having been respectively subjected to different attenuation factors.

---

This application is a continuation-in-part of application Ser. No. 255,819 filed Feb. 4, 1963.

This invenion relates to the control of the variable response of an electrical apparatus, said variable response including a succession of comparatively steep high amplitude voltage variations or "peaks" and having, between the peaks, a comparatively slowly drifting minimal value or "base line."

The invention relates more particularly to a device for automatically controlling, in conformity with a predetermined programme, the various processing operations which are to be performed on the information contained in the said variable response, while the electrical apparatus is in operation.

It is at present very common to translate into an electrical factor—voltage or current—the concentrations of a compound or element contained in a mixture subjected to analysis. Thus, the response is generally electrical in infra-red analysers and other spectrophotometers, nephelometers, photoelectric colorimeters, pH-meters, polarographs, chromatographs, etc. The same is the case with various instruments adapted for measuring physical quantities, notably calorimeters, pyrometers, flow meters, colorimeters, etc.

Some of the above instruments provide an electrical response including a number of successive peaks, respectively containing items of information of different natures and the maximal amplitude of each peak with respect to the corresponding amplitude of the base line, and also the area of the surface of the peaks, are to be measured. The measuring means will, in many cases, provide a digital and/or analog output information together with a display of the electrical response on a recorder.

The processing operations which are to be controlled will therefore include recording of the successive peaks and/or measuring of their maximal amplitude and/or surface and also resetting, outside the time intervals during which the peaks occur, of the base line to a constant reference voltage, as the base line has a tendency to drift. As the successive peaks generally have considerably different amplitudes, they are to be recorded and measured after having been respectively subjected to different predetermined attenuations, and this also should be controlled.

It may also happen, for instance in chromatography, that a switching from one adsorption column to another —or any other operation—should be controlled in conformity with the programme.

In prior art apparatus of the type above referred to, the control of the processing and other operations was programmed according to a predetermined time sequence produced by a time base generator. For instance, in chromatography, the time sequence was predetermined from the known times of retention of the various constituents of the gas mixture in the adsorption columns. This had the important drawback that any casual variations of the time of retention caused the recording to be erroneous.

It is, therefore, an object of the present invention to provide, in a processing apparatus of the type defined, means for controlling the various processing operations, said means being free of the above disadvantage and yet being adapted for use with various types of processing equipments and programmes.

It is another object of the present invention to provide, in an apparatus adapted for processing, in conformity with a predetermined programme, an electrical signal which includes a number of successive comparatively steep amplitude voltage variations or "peaks" respectively containing items of information of different natures and having, between the peaks, a comparatively slowly drifting minimal value or "base line," said apparatus comprising data processing means including measuring means having a signal input and a movable member the position of which is indicative of the level of the electrical signal which is applied to said measuring means, means for controlling the processing operations, said control means including: circuit means, cooperating with said movable member, for generating a control signal each time the movable member ceases to indicate a level higher than a predetermined value, said circuit means having an output; a sequence control unit; a programming unit and a delay unit, said sequence control unit having a control input and a plurality of outputs and being adapted for sequentially distributing on the respective outputs thereof signals applied to the said control input, said programming unit essentially consisting of a matrix network having a plurality of column wires which are respectively connected to the outputs of the sequence control unit and a plurality of line wires connected to said data processing means, said matrix network further including means for interconnecting the line and wire columns thereof in conformity with the said programme, said delay unit having an output which is connected to the control input of the sequence control unit and provides the said signals and an input which is connected to the output of said circuit means.

Still another object of this invention is the provision of a control device adapted for use with a processing apparatus comprising measuring means including a paper chart recorder with "maximum" contact and/or a galvanometer relay unit also provided with a "maximum" contact and/or a galvanometer relay unit also provided with a "maximum" contact, said relay unit being connected in the circuit of a voltage-to-frequency converter, the circuit means above referred to being adapted for generating a control signal each time the movable member of said recorder or of said galvanometer relay unit engages the maximum contact while the voltage indicated thereby is decreasing.

Yet a further object of this invention is to provide a control device of the type defined, wherein the delay unit is adapted to delay the control signal by at least a first and a second predetermined time interval, the second time interval being substantially larger than the first time interval.

These and other objects of the present invention will become readily apparent from the following description.

In the appended drawings:

FIG. 4 is a diagrammatic illustration of a preferred embodiment of the paper chart recorder; and FIG. 5 is a diagrammatic illustration of a preferred embodiment of the voltage-to-frequency converter.

Figure 1:
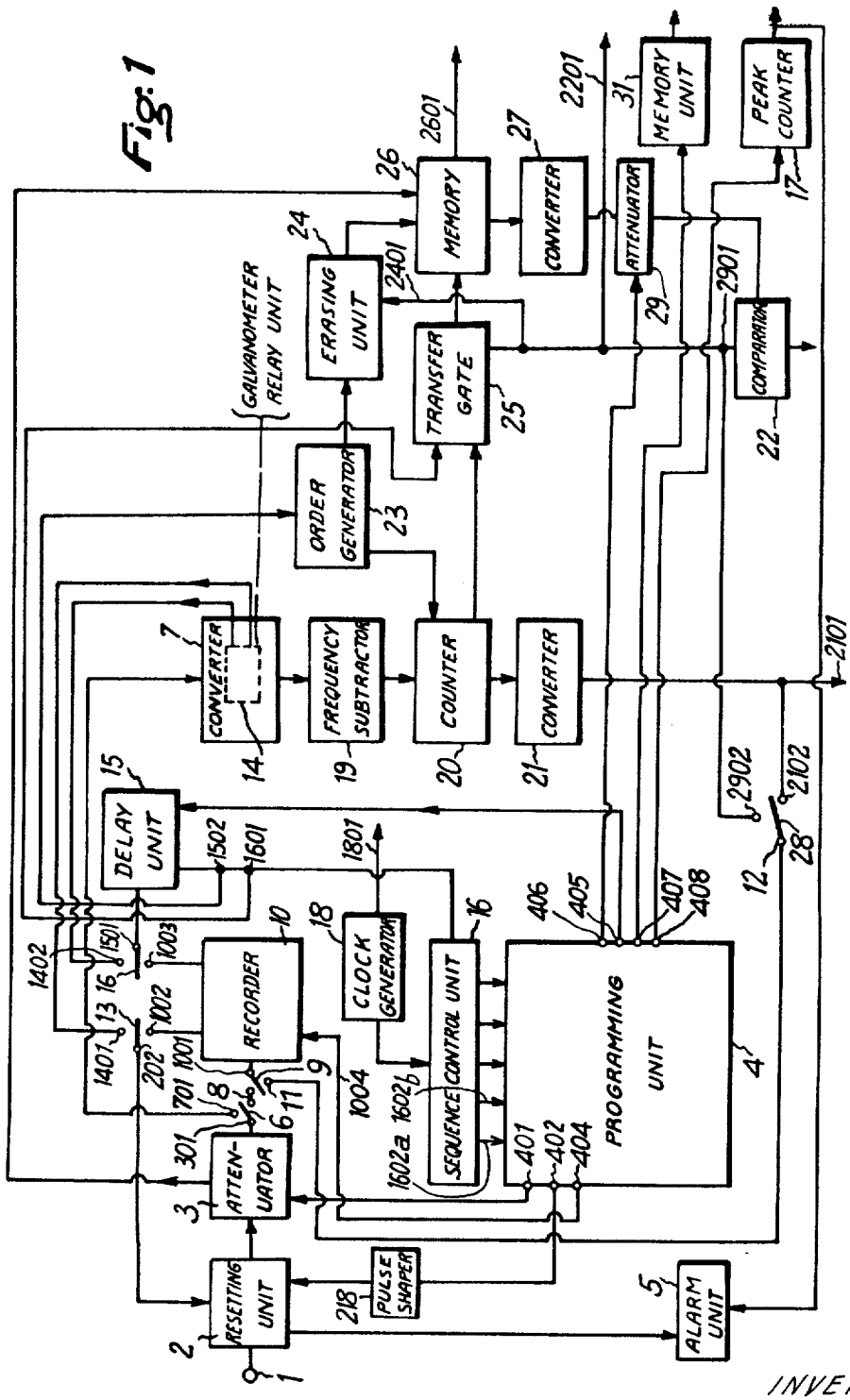
FIG. 1 is a general block diagram of a processing apparatus provided with a control device in accordance with this invention.

The processing apparatus, as illustrated in FIG. 1, receives the electrical signal to be processed, which comes for instance from the output of the electrical measuring unit included in a chromatograph, at input terminal 1.

As well known, the said signal includes a succession of comparatively steep high amplitude voltage variations or "peaks" and, between the peaks, it has a comparatively slowly drifting minimal value or "base line." The signal is applied to a device 2, which will be termed hereinafter a "resetting unit" and performs the function of automatically resetting the base line to a constant reference voltage.

The resetting unit 2 has an output 201 which is connected to an input of a variable attenuator network 3. The said attenuator has a control input which is connected to an output 401 of a programming unit 4. The resetting unit also has a control input which is connected to a further output 402 of the programming unit, and a further output which is connected to an alarm unit 5.

The attenuator has an output 301 which is connected through a switch 6, either to the input terminal 701 of a voltage-to-frequency converter 7, or to a terminal 8. The terminal 8 is in turn connected, through a switch 9, either to an input 1001 of a recorder 10, or to a further terminal 11 in turn connected to a terminal 12.

The recorder 10 has further terminals 1002 and 1003 and a control input 1004, the latter being connected to an output 404 of the programming unit.

The resetting unit has a further control input 202 which is connected, through a switch 13, either to terminal 1002 or to an output 1401 of a relay galvanometer unit 14, which is in fact a part of the converter 7 as will be explained hereinafter with reference to FIG. 5.

The galvanometer relay 14 has a further output 1402. A delay unit 15 has an output 1501 which is connected, through a switch 16, either to terminal 1003 or to terminal 1402, a further output 1502, which is permanently connected to an input of a generator 23, the latter being adapted for producing resetting order signals, as will be explained hereinafter. The generator 23 has a further input which is connected to an input terminal 1601 of a sequence control unit 16. Terminals 1502 and 1601 are connected together. The sequence control unit 16 has a plurality of outputs which are connected to respective inputs of the programming unit 4. The latter has an output 405 which is connected to a control input of delay unit 15.

The sequence control unit has an input which is connected to an output of a clock generator 18. The latter generator has a further output 1801.

The voltage-to-frequency converter 7 has an output which is connected to the input of a device 19 which is adapted for subtracting a constant frequency from the frequency of the pulses generated at the output of converter 7. The output of the frequency subtractor 19 is connected to the input of a counter 20, in turn having an output which is connected to the input of a digital-to-analog converter 21. Converter 21 has an output which is connected to an input of a voltage comparator 22, to an output lead 2101, and to a terminal 2102.

The order generator 23 has a first output which is connected to an input of an erasing signal generator 24 and a second output which is connected to a resetting control input of counter 20.

Terminal 1601 is connected to an input of a transfer gate 25, which has a further input connected to an output of counter 20, and yet a further input connected to an output of comparator 22, together with an input 2401 of the erasing unit. The output of the transfer gate is connected to an input of a memory unit 26. The memory unit has a further input which is connected to an output of the erasing unit, yet a further input which is connected to an output of attenuator 3, an output lead 2601 and a further output which is connected to the input of a digital-to-analog converter 27. Converter 27 has an output which is connected to the input of a variable attenuator 29. The latter has an output 2901 which is connected to a terminal 2902 and to a further input of comparator 22.

A switch 28 connects terminal 12, either to terminal 2902 or to terminal 2102.

The attenuator 29 further has a control input which is connected to a terminal 406 of the programming unit. The comparator 22 has an output lead 2201.

The programming unit has an output 407 which is connected to a memory unit 31, and an output 408 which is connected to a peak counter 17. The latter has an output which is connected to an input of alarm unit 5.

The operation of the processing apparatus which has been described hereinabove is roughly as follows:

The apparatus has first and second modes of operation according to as switch 6 connects the output of attenuator 3 to the input 701 of the converter 7 or to the terminal 8, the latter being normally connected, through switch 9, to the input 1001 of recorder 10.

In the first mode of operation, the apparatus provides, either under digital form (on lead 2601) or on analog form (on lead 2101) an output which is a measure of the area of the surface of each peak, the said area being, as well known, directly proportional to the concentration of each constituent of the gaseous mixture which is to be analysed. Under its analog form, this output is adapted for the direct control of a regulating system which is not part of the present invention. The said system is a feedback loop which controls the plant which produces the said mixture, as a function of the information contained in the said output.

Under digital form, the information contained in said output is adapted to be further processed by a computer, before effecting control of the plant.

In the second mode of operation, the apparatus provides a display of successive peaks on the paper chart of recorder 10; this display is adapted to be used for continuously effecting a visual control of the operation of the plant.

It is to be understood that part of the apparatus may be omitted when only part of the above discussed different modes of control is needed.

One should have in mind that the processing of the signal which is applied on terminal 1 essentially includes, for either of the modes of operation above referred to: a resetting of the base line to a reference voltage (this resetting is to be effected in the time intervals between the successive peaks); a predetermined attenuation of each of the successive peaks (as the successive peaks each corresponds to a different information, namely the concentration of each of the various constituents of a gaseous mixture, their respective amplitudes will differ and should be brought back to a constant value in order not to exceed, yet fully to utilize the maximal capacity of the county 20, of the recorder 10 or any other instrument wherein the peaks are to be stored) and a control of the programme in accordance with which the various processing operations and possibly, other operations are to be carried out.

The present invention more particularly refers to the control of the processing operations and, therefore, the resetting of the base line will not be disclosed here in great detail.

However, a complete apparatus has been illustrated for illustration purposes only, in view of enabling one properly to understand the object of the present invention. The disclosure will be made with specific reference to a chromatograph, though this invention may apply to other electrical responses of the general type disclosed hereinabove.

One should have in mind that the gaseous mixture to be analysed by the chromatograph is continuously generated during operation of the plant. The clock generator 18 provides pulses at comparatively long regular time intervals.

Each pulse is applied, via lead 1801, to the chromatograph in view of starting an analysis. This analysis will provide, at input 1, a set of a predetermined number of peaks, each of the peaks corresponding to one of the constituents of the gaseous mixture. Normally, the respective time intervals between the successive peaks and the respective amplitude of the peaks will have predetermined values.

The pulses from clock generator 18 also are applied to sequence control unit 16 in view of resetting it to zero. This is done well after an analysis has been completely performed, and enables the unit 16 to control a new analysis.

A brief discussion of the second mode of operation of the apparatus will now be made with reference to FIG. 1.

In the said mode, the switch 6 connects the attenuator to terminal 8, the switch 9 normally connects the latter terminal to the input 1001 of the recorder, the switch 13 connects terminals 22 and 1002, and the switch 16 connects terminals 1003 and 1501.

One will first consider what happens during a time interval between two successive peaks.

The recorder 10 permanently displays the electrical response signal (after passage thereof through units 2 and 3) on a paper chart, the motion of which is controlled by a signal provided by the programming unit, at output 404 thereof. The recorder includes, as will be explained more in detail hereinafter with reference to FIG. 4, means for generating a D.C. voltage, which is applied on terminal 1002, each time the displayed signal has an amplitude lower than a predetermined low value (which corresponds to the reference voltage above referred to) and means for generating a further D.C. voltage, which is applied on terminal 1003, each time the displayed signal reaches a predetermined high value (which normally substantially corresponds to the top of the peak).

The D.C. voltage which is generated each time the displayed voltage is lower than the said low level triggers a counting up operation of a reversible counter included in the resetting unit, with the result that the displayed voltage is increased, while the absence of the said D.C. voltage (which corresponds to the fact that the displayed voltage exceeds the said low level) triggers a counting down operation of the reversible counter, with the result that the displayed voltage is decreased. It finally results that the displayed voltage is reset to the said low level in the absence of a peak.

However, during the preceding peak, the displayed voltage has exceeded the predetermined high value above referred to, at which time a control pulse has been transmitted (in a manner which will be explained hereinafter) to the delay unit 15. The said pulse has been transmitted, after a predetermined delay, to the sequence control unit 16. So will be explained hereinafter, the unit 16 preferably is an electronic stepping switch which generates a voltage on its output 1602a the first time it receives a pulse from the delay unit and generates a voltage on its output 1602b the second time, etc. Thus, to each of the successive peak tops, there corresponds the application of a pulse to a different one of the successive inputs of the programming unit.

The progamming unit, for each of the operative intervals or "sequences" thus defined, provides on its output 402 an order signal which is adapted for enabling the resetting unit to operate, and further provides, on its output 401, an order signal which is adapted to set the attenuator to a predetermined attenuation value, the latter value being different for each of the peaks and selected as a function of the programme contained in unit 4. The programming unit will be disclosed in more detail hereinafter.

In fact, the resetting unit operates only during a short time interval when it receives an order signal from terminal 402 and this is why, after the said short time interval, the displayed voltage may increase again when a succeeding peak will occur.

The delay provided by unit 15 is useful for avoiding that the programming unit will provide the attenuator with the order to change the attenuation value as soon as a pulse is generated on terminal 1003, i.e., at the top of the peak. The delay is normally predetermined in such a manner that the attenuation value will not change before the end of any of the peaks.

A connection has been shown in FIG. 1 between terminal output 405 of the programming unit and an input of the delay unit: through the said connection, the delay unit may receive from the programming unit, when desired, an order to provide a second time delay substantially larger than the first delay it normally provides. This will be provided for instance, in view of stopping the processing of the information when a number of intermediate peaks should be eliminated from the information which has to be processed, or when the chromatograph should be switched from one adsorption column to another.

Each time the drift of the base line exceeds a predetermined value the maximal capacity of the counter included in the resetting device is exceeded and, therefore, the latter device cannot properly operate: then an alarm unit 5 which is connected at the output of the said counter and responsive of any over-stepping of the maximal capacity thereof is triggered into operation.

The alarm unit 5 also is triggered by a signal provided by the peak counter 17 each time the number of peaks in a sequence, as counted by the said counter, differs from that which was expected.

The output 407 of the programming unit transfers to memory unit 31 signals representative of the various sensitivities successively used in the course of an analysis, i.e., of the successive attenuation value with which the successive peaks have been recorded, as predetermined by the programme.

The information thus contained in memory unit 31 will be used by the above mentioned computer for calculating, from the attenuated peak amplitudes displayed in recorder 10, the initial amplitudes of the peaks as applied to input 1 of the apparatus.

Now, the first mode of operation of the apparatus will be discussed, still with reference to FIG. 1.

In the said mode of operation, the switch 6 is positioned so as to connect the attenuator to converter 7 and, therefore, the attenuated signal, instead of being displayed on the recorder 10. is converted into a train of recurrent pulses the frequency of which is proportional to the amplitude of the signal.

As will be explained more in detail with reference to FIG. 5, the converter 7 provides an output frequency $F_0$ when the signal at the output of the resetting unit equals the reference voltage.

This frequency $F_0$ should be subtracted from the total output frequency $F+F_0$ of the converter and this is done by means of a device 19 which may be of conventional design, and is not part of the present invention. The counter 20 counts the pulses of frequency F during this time of each peak and, therefore, its count is proportional to the peak surface. At the end of each peak, the said count is transferred to memory unit 26. Of course, before each transfer of the count into memory, the memory unit will be erased by means of a signal provided by unit 24, whereas, after each transfer of the count into memory, the counter 20 will be reset to zero.

The resetting order signals will be provided to counter 20 and to erasing unit 24 by order signal generator 23, whereas the transfer of the count into memory will be authorized by gate 25. The manner according to which units 23 and 25 are themselves controlled will be discussed hereinafter.

The contents of memory unit 26 are available on output lead 2601 under digital form, in view of being transferred to a computer, as explained hereinabove. The memory contents also may be converted into an analog signal by converter 27, whereas the count of the counter 29 is converted into an analog signal by converter 21: the latter signal will have an amplitude which is proportional to the surface of a given peak, whereas the former signal will have an amplitude proportional to the surface of the preceding peak. The comparator 22 will compare the amplitude of the said signals. Should the difference between the said amplitude exceed a predetermined value, an inhibiting signal will be transmitted from the comparator to unit 25, in view of preventing the transfer into memory of an obviously erroneous count of the counter. It may be necessary, in the case when two succeeding peaks should normally have substantially different amplitudes, to attenuate one of the two signals before comparing them: this will be done in variable attenuator 29, when the programme so requires.

The comparator 22 further transmits an alarm signal on lead 2201 each time the amplitude difference exceeds the predetermined value as explained hereinabove.

The analog voltage from converter 21 may be transmitted to a regulating system through lead 2101, or be displayed on recorder 10 (through contacts 12 and 2102, then connected by switch 28, and contacts 11 and 1001, then connected by switch 9), according to the type of control which is to be performed.

The operating steps of the apparatus, in its first mode of operation which has just been roughly discussed are as follows:

The galvanometer relay unit 14, as will be explained in more detail hereinafter, includes means for generating a first or a second D.C. voltage, which are applied on terminal 1401 each time the voltage at the input of the converter 7 respectively has an amplitude lower or higher than a predetermined low value (which corresponds to the reference voltage above referred to) and means for generating a pulse, which is applied on terminal 1402, each time the displayed voltage reaches a predetermined high value (which normally corresponds to the top of the peak). The D.C. voltage on terminal 1401 enables the resetting unit to operate exactly in the same manner which has been disclosed hereinabove with reference to the second mode of operation, during the time intervals, as determined from the programme, when the resetting unit receives a resetting order from output 402 of the programming unit.

At the top of a peak, a D.C. voltage will appear on terminal 1402 and, the switch 16 then connecting terminals 1402 and 1501, the said D.C. voltage will be converted into a pulse (as will be explained hereinafter) and the said pulse will be transmitted, after a delay in unit 15, to the sequence control unit, and will control a new interval of operation of the programming unit, as explained hereinabove with reference to the second operating mode.

This means that everything will be prepared for the storage of a new peak with the proper attenuation, as defined by the programme. In other words, in the first mode of operation, terminals 1401 and 1402 respectively play the same part as do terminals 1002 and 1003 in the second mode, and everything takes place in the same way (including the operation of alarm unit 5, of the peak counter 32 and of the clock 18) except that the signal, after resetting of the base line and proper attenuation, is processed by converter 7 instead of being directly displayed on recorder 10.

The order signal generator 23 and the transfer gate 25 are respectively controlled for each of the above defined "sequences," by the above mentioned pulse, after transmission thereof through delay unit 15.

It is to be understood that the operation of units 20 to 29 is not part of the present invention and need not be disclosed in more detail.

Figure 2:
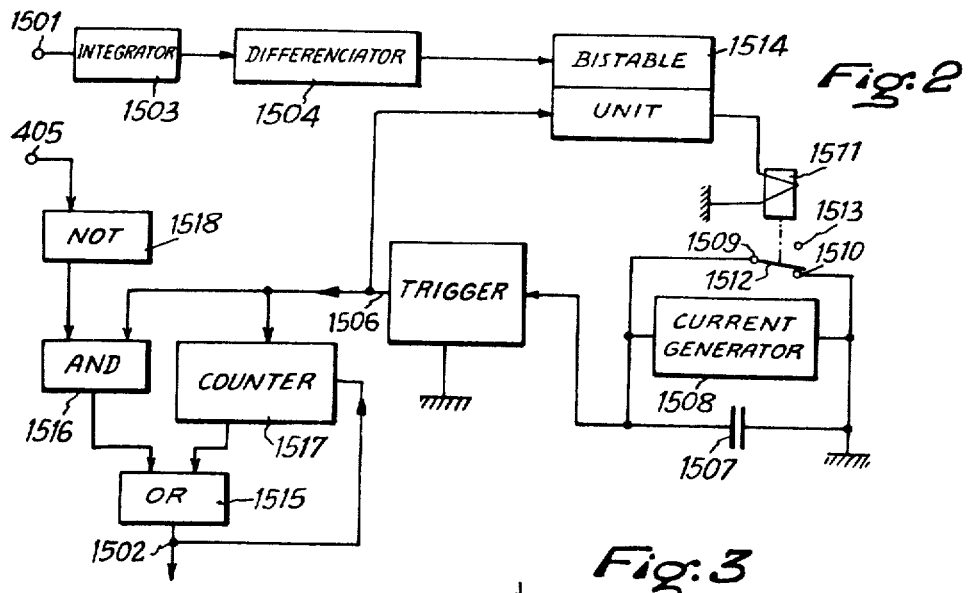
FIG. 2 is a block diagram of a preferred embodiment of the delay unit which is incorporated in the apparatus of FIG. 1.

FIG. 2 illustrates a preferred embodiment of the delay unit 15 of FIG. 1 which is part of the present invention.

The said delay unit is connected to terminal 1501 of FIG. 1 through an integrator 1503 in series with a differentiator 1504, to terminal 405 of the programming unit 4 and to terminal 1502 (FIG. 1).

The delay unit includes a trigger 1505 which provides a pulse at the output 1506 thereof each time that the voltage across a condenser 1507 exceeds a predetermined value. Condenser 1507 is charged by the current provided by a constant current generator 1508 when terminals 1509 and 1510 are not connected. When the said terminals are connected, the current generator is short-circuited. This normally is the case when a relay 1511 is not energized and its movable member 1512 is not attracted. Each time the relay is energized by a voltage provided by a bistable unit 1514, the movable member 1512 connects terminals 1509 and 1513 together, and the condenser starts being charged. When the trigger is operated, the condenser rapidly discharges through the circuit of the trigger, not illustrated. This circuit may be of conventional design, and need not be disclosed in more detail.

The pulse generated at the output of the trigger is translated to terminal 1502 through an OR-circuit 1515, which receives the said pulse, either through an AND-gate 1516 or through counter 1517.

The AND-gate 1516 is further controlled from a NOT-gate 1518, the input of which is connected to terminal 405.

Bistable unit 1514 has first and second control inputs which are respectively connected to output 1506 and to the output of the differentiator.

Terminal 1502 is connected to a reset input of counter 1517.

Counter 1517 is a conventional "scale-of-$n$" and, therefore, provides a pulse at its output when the last of $n$ successive pulses have been applied to its control input which is connected to terminal 1506.

In operation, for each of the first and second modes above referred to, a D.C. voltage is applied to terminal 1501, as explained hereinabove, each time the voltage indication of the galvanometer relay unit or of the recorder, respectively, reaches a predetermined "high" value. This D.C. voltage is converted into a pulse by integrator 1503 and differentiator 1504, and said pulse is negative going or positive going according to as the high value is reached while the voltage indication decreases or increases, respectively. Bistable unit 1514 being arranged for being responsive only to negative going pulses, it results that relay 1511 may be energized only during the descending portion of the peak, a short time after the top thereof has been reached. The energization of relay 1511 has the effect of starting the charge of condenser 1507, as explained hereinabove and, after a predetermined time interval $\theta$ which is the time necessary for charging the condenser up to the predetermined value above defined, a pulse is provided at terminal 1506. The said pulse will reset the bistable unit into its initial state, and be applied both to the counter and to the AND-gate 1516.

Should the first delay defined hereinabove be required, no D.C. voltage will then be provided by the programming unit at terminal 405 and, therefore, a D.C. voltage will be applied from NOT-gate 1518 to AND-gate 1516. The said gate will then be authorized to translate the pulse at terminal 1502.

Finally, a control pulse will be provided at output 1502 of the delay unit with a time delay $\theta$ with respect to the time when the high value is reached during the descending portion of the peak. The time delay $\theta$ is so selected that the delayed pulse will not in any case control the starting of a new sequence until the complete end of the preceding peak, i.e. the time when the voltage indication again corresponds to the base line value. Due to this feature of the invention, each peak will be completely processed during the same sequence, i.e., in particular, with the same attenuation factor.

Should, however, the second delay defined hereinabove be required, a D.C. voltage will then be provided by the programming unit at terminal 405 and, therefore, the AND-gate will not be authorized to translate the delayed pulse from terminal 1506. This pulse will then start a counting up operation of the counter, which will provide a pulse on terminal 1502 after a time delay $n\theta$. For instance, one may design the counter as a scale of ten, which will give $n=10$.

Figure 3:
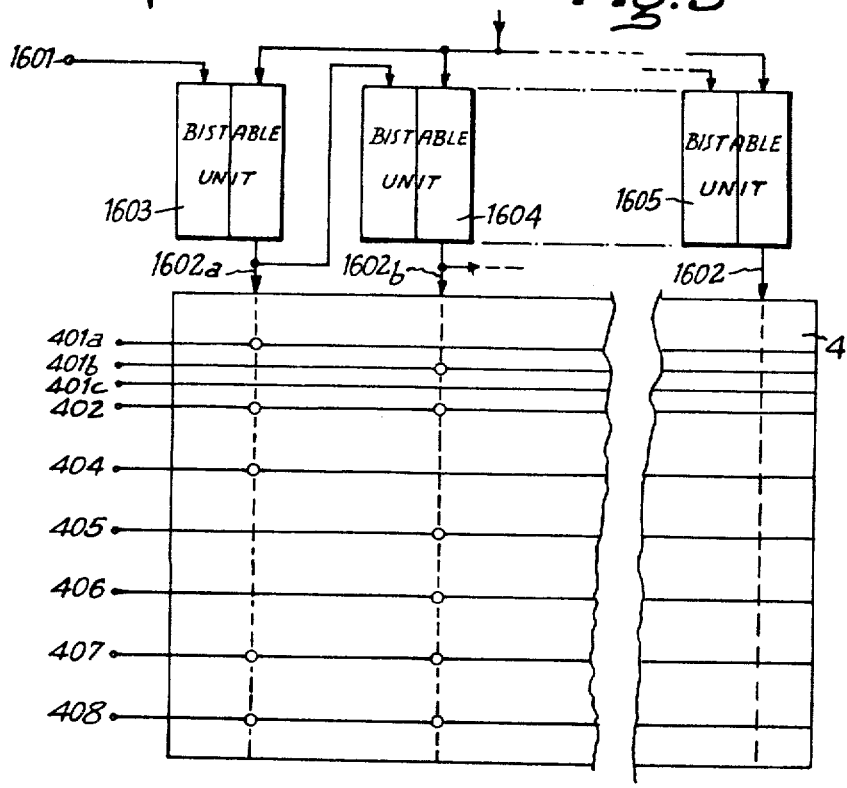
FIG. 3 is a diagrammatic illustration of the sequence control and programming units.

The sequence control unit 16 and the programming unit 4 of FIG. 1 will now be disclosed in more detail, with reference to FIG. 3.

The sequence control unit includes a plurality of $n$ serially connected bistable devices 1603, 1604 . . . 1605 which operate as a conventional shift register: this means that a D.C. voltage will be provided on output 1602a when a first pulse has been received on input 1601. The second pulse shifts this D.C. voltage on to output 1602b and finally the $n$th pulse transfers the D.C. voltage on to output 1602c.

Any pulse applied to unit 16 from the clock generator will reset it to zero.

The respective outputs of the sequence control unit are connected to the "column" wires (illustrated in interrupted line) of a matrix network or of conventional design. The latter network has "line" wires 401a, 401b . . . 401c, 402, 404, 405, 406, 408 and 409 and no electrical connection is established between a column and a line wire, except when a plug is inserted at the crosspoint therebetween.

A programme is determined through insertion of plugs at predetermined crosspoints: the circles illustrated in FIG. 3 symbolize the crosspoints where plugs are inserted for a definite programme which is given as an illustration only.

It is seen that, in the programme illustrated, peak No. 1 of the sequence will be attenuated by a factor which is defined by the line wire 401a, peak No. 2 by a factor which is defined by the line wire 401b.

The construction of the variable attenuator 3 is conventional and need not be disclosed. Though the said attenuator has been illustrated in FIG. 1, for the sake of clarity, with one control input 401 only, it is to be understood that it has a plurality of control inputs which are respectively connected at terminals 401a, 401b . . . 401c and each provides a predetermined attenuation factor. The line wire 402 provides a D.C. voltage which is normally established at the end of the time delay $\theta$ above referred to. The rising wavefront thus generated is converted by means of a conventional circuit 218 (FIG. 1) into a control pulse having a calibrated duration, for instance 200 ms. The resetting unit is thus operated only during a 200 ms. time interval at the beginning of each sequence.

In the programme as illustrated, no plug is inserted at the crosspoint between column 1602b and line 404. This means that, during the recording of the second peak, the paper chart will not be displaced and it results that the second peak will be recorded as a vertical stroke, which may be advantageous in certain cases.

If one now considers line 405, it appears that, in the illustrative programme, the normal delay $\theta$ will be provided for the first peak, whereas a longer delay $n\theta$ will be provided for the second peak.

It is to be emphasized that the processing control device as disclosed hereinabove will provide a correct processing of each peak even in the case when the peak does not exactly occur at the time it was normally expected.

Moreover, through cooperation with the alarm unit (5) FIG. 1, the device will avoid any error due to the occurrence of unexpected peaks or abnormally large drifts of the base line.

It is clear that, should an unexpected peak occur in the interval between two normally expected peaks, the unexpected peak will be recorded or measured without switching the sequence control unit and, therefore, without disturbing peaks, provided that the unexpected peak will not reach the above defined high level.

Should, however, the unexpected peak reach the said level, it will result a stepping to the next sequence. If this occurs when the apparatus is operating according to the first mode, as the normally expected peaks will not then be applied to the converter (7, FIG. 1) with the normal attenuation factors which had been predetermined from the programme, it will generally result that comparator 22 will trigger the alarm unit and inhibit the operation of the transfer gate 25.

If, however, the stepping to the next sequence occurs when the apparatus is operating according to the second mode, at the end of the series of peaks, the peak counter 17 will indicate a number of peaks superior by one to that which was expected, and this also will trigger the alarm.

FIGURE 4 illustrates a preferred embodiment of recorder 10. The paper chart is driven in the direction of the arrow, by means of a motor 1005 the operation of which is controlled by pulses transmitted by lead 1004 from pulse shaper 218, as explained hereinabove. The stylus 1006 of the recorder scans the paper in a direction perpendicular to the arrow, under the control of a motor 1007.

In the simplified diagram of FIG. 1, only one signal input 1001 has been illustrated: in fact, the recorder comprises two inputs 1001a and 1001b across which the attenuated electrical response signal is applied, and to which two outputs 215a and 215b of the resetting unit 25 are respectively connected. The recorder includes a fixed lead 1008, one end of which is connected to terminal 1001b and the two ends of which are connected to a voltage source 1009.

A contact 1010 slides along lead 1008 and is driven by motor 1007 together with stylus 1006. The contact 1010 is connected to terminal 1001a and controls the operation of motor 1007. First and second bars 1011 and 1012 are supported, by means not shown, a little distance above the paper chart, parallel to the motion of the stylus. The latter supports a sensor 1013 which slides along both bars 1011 and 1012. Bar 1011 consists of an electrically insulating material in the left half thereof (which corresponds to the displayed voltages higher than the above mentioned "low level") and conductive in the right half thereof (which corresponds to the displayed voltages lower than the said level). Bar 1012 is insulating except for the left-end portion thereof, which corresponds to the displayed voltages higher than the said high level.

Terminal 1002 is connected to the conductive part of bar 1011, whereas terminal 1003 is connected to the conductive part of bar 1012.

The operation of the recorder is as follows:

When the current which controls the operation of motor 1007 and is supplied through slidable contact 1010 becomes null, contact 1010 and stylus 1006 stop moving and the position of the stylus then is indicative of the voltage across terminal 1001a and 1001b: said voltage is therefore displayed on the recorder paper chart.

Lead 215b is connected to terminal 215a of the resetting unit in such a manner that the voltage on terminal 1001b is constant and equal to $V/2$, V being the analog voltage which corresponds to the maximal capacity of the counter which is included in the resetting unit.

The voltage $v$ on lead 215a varies between the limits $$-\frac{V}{2} \text{ and } +\frac{V}{2}$$

and therefore, the "corrected voltage" on stylus 1006, varies between the limits $$V_e + \frac{V}{2} \text{ and } V_e - \frac{V}{2}$$

$V_e$ between the attenuated electrical response voltage. It is clear that a D.C. voltage is transmitted to terminal 1002 each time the corrected voltage is under the low level and that a D.C. voltage is transmitted to terminal 1003 each time the corrected voltage exceeds the high level. The rising edge of the latter D.C. voltage will be converted into a pulse by units 1503 and 1504 (FIG. 2), in view of operating the delay unit 15.

FIG. 5 illustrates a preferred embodiment of converter 7 and galvanometer relay unit 14.

The converter includes a differential amplifier 702 having a first input connected to a terminal 701a and a second input connected to a terminal 701b via a resistor 703. The attenuated electrical response voltage is applied across terminals 701a and 701b; terminal 701a is connected to terminal 215a of resetting unit 2, while terminal 701b is connected to terminal 215b. The output of amplifier 102 is connected, via a constant-current generator 704, to the electrical circuit of a galvanometer 1403, in turn connected to a first terminal of a condenser 705 and to a trigger unit 706. Unit 706 has a control input 707 which connected to terminal 701b, and an output 708 which is connected, on one hand, to the frequency subtractor 19 of FIG. 1 and, to the other hand, to the control input of an electronic switch 709, the latter connecting a second terminal of condenser 705 to terminal 701b.

The galvanometer has a movable pointer 1404 which is energized, through a supple lead 1405, from terminal 701a.

A senser 1406, supported by pointer 1404, is adapted to slide along two elongated members 1407 and 1408 which are in the form of arcs of a circle and are supported, by means not shown, in a fixed position. Member 1407 is conductive in the left half thereof (which corresponds to the value of the corrected voltage lower than the "low level") and insulating in the left half thereof. Member 1408 is insulating, except its right end, which corresponds to the values of the corrected voltage higher than the "high level." The said right end is connected to terminal 1402, FIG. 1.

The operation of the voltage-to-frequency converter of FIG. 5 is as follows.

The electrical response voltage applied to terminal 701a will have the effect of providing at the output of amplifier 702, a voltage proportional to the amplitude of the said response, the latter voltage in turn controlling generator 704 so as to provide a proportional current. It results that condenser 705 starts to be charged. As soon as the voltage across terminals of condenser 705 reaches a predetermined triggering level, the device 706 is triggered and provides a pulse at the output 708 thereof. The said pulse has the effect of opening the electronic switch for a short time interval, so that condenser 705 will discharge. At the end of the pulse, the condenser again starts to be charged, and so on. Finally, as well known in this type of voltage-to-frequency converter pulses are generated at the output terminal 708 of the device, with a recurrent frequency proportional to the voltage across terminals 701a, 701b, i.e. to the voltage $$v + V_e - \frac{V}{2}$$

As explained hereinbefore, the resetting device, during each resetting operation of the base line, resets the voltage $V_e + v$ on terminal 701a to a reference value, generally the zero value. Therefore, the said recurrent frequency, in the absence of any peak, finally has a value to which is proportional to $V/2$. When a peak having an amplitude $V_p$ is present, the recurrent frequency at the output of converter 7 if $F+F_0$, F being proportional to $V_p$. As explained hereinabove, the device 19 subtracts the frequency $F_0$ and finally, provides to the counter a frequency which is at any time proportional to $V_p$, $V_p$ being the level difference between the peak and the corrected base line.

Now, it is clear that each time the corrected voltage on terminal 701a is under the "low level," a D.C. voltage is transmitted to terminal 1401 through lead 1405, senser 1406 and the conductive part of member 1407. Therefore, the operation of the resetting device, in the case when the latter is cooperating with converter 7, is exactly the same as that which has been discussed hereinabove with reference to the case when the resetting device is cooperating with recorder 10.

Each time the corrected voltage exceeds the "high level," it is clear that a D.C. voltage is transmitted to terminal 1402, through lead 1405, senser 1406 and the conductive portion of member 1407. Said D.C. voltage will be converted into a pulse for transmission to the delay unit 15 in the manner which has been explained hereinabove.

It is to be understood that various modifications could be made to the apparatus which is illustrated in the drawings, without departing from the spirit and scope of this invention.

What is claimed is:

1. In an apparatus adapted for processing in conformity with a predetermined programme, an electrical signal which includes a number of successive comparatively steep amplitude voltage variations or "peaks" respectively containing items of information of different natures and having, between the peaks, a comparatively slowly drifting minimal value or "base line," said apparatus comprising data processing means including measuring means having a signal input and a movable member the position of which is indicative of the level of the electrical signal which is applied to said measuring means: the provision of means for controlling the processing operations, said control means including: circuit means, cooperating with said movable member, for generating a control signal each time the movable member ceases to indicate a level higher than a predetermined value; said circuit means having an output; a sequence control unit; a programming unit and a delay unit, said sequence control unit having a control input and a plurality of outputs and being adapted for sequentially distributing on the respective outputs thereof the signals applied to the said control input, said programming unit essentially consisting of a matrix network having a plurality of column wires which are respectively connected to the outputs of the sequence control unit and a plurality of line wires connected to said data processing means, said matrix network further including means for interconnecting the line and wire columns thereof in conformity with the said programme, said delay unit having an output which is connected to the control input of the sequence control unit and provides the said signals and an input which is connected to the output of said circuit means.

2. A data processing apparatus as claimed in claim 1, wherein the movable member of said measuring means is a conductive pointer movable along a predetermined path, said circuit means further including: an elongated member located parallel to said path and having a conductive portion and an insulating portion; conductive senser means supported by said pointer in sliding contact with said elongated member, whereby a D.C. voltage is established on said conductive senser means each time the signal which is applied to the measuring means exceeds a predetermined value, said D.C. voltage being cut-off when the said signal ceases to exceed the said value; means connected to said conductive senser means, for generating, from the said D.C. voltage, a pulse of a first polarity at the time when the said D.C. voltage is established and a pulse of a second polarity at the time when the said D.C. voltage is cut-off; and means for generating the said control signal from the said pulse of the second polarity.

3. A data processing apparatus as claimed in claim 1, wherein the said delay unit has an output and includes: a condenser; generator means for charging said condenser so as to develop across said condenser a voltage which is a linear function of time; control means, cooperating with said generator means, for starting the charge of said condenser at the time when said control signal is generated; further means for triggering the discharge of said condenser each time the voltage across said condenser has reached a predetermined value, said further means having an output and being adapted to provide a pulse on the said output each time the discharge of said condenser is triggered; first circuit means connecting to the said output to the output of the delay unit and adapted for immediately translating the said pulse; second circuit means, connecting the said output to the output of the delay unit, said second circuit means including a "scale-of-$n$" pulse counter; and means, connected to the programming unit, for inhibiting the operation of said first circuit means.

References Cited
UNITED STATES PATENTS

| | | | |
|---|---|---|---|
| 2,823,370 | 2/1958 | Oestreicher | 340—172.5 |
| 2,827,626 | 3/1958 | De Motte | 340—347 |
| 2,843,230 | 7/1958 | Chisholm | 235—92 |
| 2,951,235 | 8/1960 | Welsh | 340—172.5 |
| 3,010,651 | 11/1961 | Hempel | 235—92 |
| 3,017,611 | 1/1962 | Stemme | 340—172.5 |
| 3,034,101 | 4/1962 | Loewe | 340—172.5 |
| 3,067,937 | 12/1962 | Hinkeim et al. | 235—157 |
| 3,076,956 | 2/1963 | Hagan et al. | 340—172.5 |
| 3,136,979 | 6/1964 | Perotto | 340—172.5 |
| 3,160,740 | 12/1964 | Mann et al. | 235—92 |

OTHER REFERENCES

EPSCO Components, Bul. 2000, "Transistor Decade Counter Model TDC–100," January 1958, 4 pages.

ROBERT C. BAILEY, *Primary Examiner.*

P. J. HENON, *Assistant Examiner.*